United States Patent
Halasz et al.

(10) Patent No.: US 7,760,710 B2
(45) Date of Patent: *Jul. 20, 2010

(54) ROGUE ACCESS POINT DETECTION

(75) Inventors: David E. Halasz, Stow, OH (US);
Merwyn B. Andrade, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 763 days.

This patent is subject to a terminal disclaimer.

(21) Appl. No.: 11/613,594

(22) Filed: Dec. 20, 2006

(65) Prior Publication Data

US 2007/0180244 A1 Aug. 2, 2007

Related U.S. Application Data

(63) Continuation of application No. 09/917,122, filed on Jul. 27, 2001, now Pat. No. 7,181,530.

(51) Int. Cl.
*H04L 12/66* (2006.01)
(52) U.S. Cl. ............... 370/352; 709/238
(58) Field of Classification Search ............ 370/230, 370/338, 352, 252; 713/175, 168, 186; 709/223
See application file for complete search history.

(56) References Cited

U.S. PATENT DOCUMENTS

| | | | |
|---|---|---|---|
| 5,963,540 A * | 10/1999 | Bhaskaran | 370/218 |
| 6,792,280 B1 * | 9/2004 | Hori et al. | 455/517 |
| 6,839,340 B1 * | 1/2005 | Voit et al. | 370/352 |
| 6,847,625 B2 * | 1/2005 | Heinonen et al. | 370/338 |
| 7,027,432 B2 * | 4/2006 | Carolan et al. | 370/352 |
| 7,047,288 B2 * | 5/2006 | Cooper et al. | 709/223 |
| 7,055,173 B1 * | 5/2006 | Chaganty et al. | 726/11 |
| 7,120,125 B2 * | 10/2006 | Kikuchi et al. | 370/252 |
| 7,236,455 B1 * | 6/2007 | Proudler et al. | 370/230 |
| 7,270,193 B2 * | 9/2007 | Hashimoto et al. | 713/175 |
| 7,310,734 B2 * | 12/2007 | Boate et al. | 713/186 |
| 7,415,439 B2 * | 8/2008 | Kontio et al. | 705/53 |
| 2002/0174335 A1 * | 11/2002 | Zhang et al. | 713/168 |
| 2003/0021250 A1 * | 1/2003 | Willins et al. | 370/338 |

* cited by examiner

*Primary Examiner*—Thong H Vu (57) ABSTRACT

A method of detecting a rogue access point is disclosed. A message is directed from a supplicant to a network through a first access point. A response message is received by the supplicant from the first access point. The supplicant can determine the first access point is a rogue access point based on whether the response message from the first access point is in nonconformity with a predetermined expectation. After the access point is determined to be a rogue access point, it is reported to the network through a valid network access point, after the supplicant is authenticated to the network.

20 Claims, 5 Drawing Sheets

ROGUE ACCESS POINT DETECTION

CROSS-REFERENCE TO RELATED APPLICATIONS

This application is a continuation of U.S. patent application Ser. No. 09/917,122 filed Jul. 27, 2001 now U.S. Pat. No. 7,181,530.

BACKGROUND OF THE INVENTION

The present invention is generally directed to the field of security measures for wireless LAN technology. In a wireless local area network (or WLAN) a wireless client seeks to connect to the network in order to exchange data. There are three states in connecting to the network as specified by the IEEE 802.11 specification for WLANs:
 1. Unauthenticated and Unassociated
 2. Authenticated and Unassociated
 3. Authenticated and Associated.

Authentication is the process of verifying the credentials of a client desiring to join a WLAN. Association is the process of associating a client with a given Access Point (AP) in the WLAN. IEEE 802.11 defines two types of authentication methods—Open Key System Authentication and Shared Key Authentication. A successful completion of the association and authentication phases allows a WLAN node successful entry into the WLAN subsystem.

The IEEE 802.11b standard attempts to provide "privacy of a wire" using an optional encryption scheme called "Wired Equivalent Privacy" (or WEP) in which a data frame or "payload" is run through an encryption algorithm, the output of which replaces the original payload. With "open key authentication" the entire authentication process is done in clear text. This means since the entire process is performed without encryption, a client can associate to the AP with the wrong WEP key or no WEP key. But as soon as the client tries to send or receive data it is denied access for not having the correct key to process the packet. With "shared key authentication" there is a challenge text packet that is sent within the authentication process. If the client has the wrong key or no key it will fail this portion of the authentication process and will not be allowed to associate to the AP.

This choice (open or shared key) is manually set on each device (AP and client). There should be a match in the method chosen by the client and the AP for the association to succeed. The default value is for open authentication.

The entire process can be broken down into three phases:
 1) Probe Phase

When a client is initialized it first sends a "probe request" packet out on all the channels. The APs that hear this packet will then send a "probe response" packet back to the station. This probe response packet contains information such as SSID (Service Set Identifier), which the client utilizes to determine which AP to continue the association process with.
 2) Authentication Phase After the client determines which AP to continue association process with, it begin the authentication phase based upon the probe response packet. This phase can be performed in either open or shared key mode. The client and the access point both have to be set-up to the same authentication scheme for this phase to be performed properly.

OPEN AUTHENTICATION SCHEME: The client sends an authentication request to the AP. The AP then processes this request and determines (based on the configured policies) whether or not to allow the client to proceed with the association phase. The AP sends an authentication response packet back to the client. Based upon the type of response (pass or fail) from the AP, the client will either continue or discontinue the association process.

SHARED KEY AUTHENTICATION: The client sends an authentication request to the AP. The AP processes this request, generates and sends a challenge text packet to the client. The client is then required to encrypt the packet utilizing its already-configured WEP key and send the packet back up to the AP. The AP then determines if it can decipher the packet correctly. Based upon this test, the AP will send either a pass or fail in the authentication response packet to the client that determines if the client is allowed to continue the association phase or not.
 3) Association Phase When the client successfully completes the authentication phase (for example, receives a successful authentication response packet from the AP), it proceeds to the association phase. The client sends an association request packet to the AP. The AP analyses the information in this packet and if it passes, the AP adds the client to its association table. It then sends an association response packet to the client, which completes the association phase.

OVERVIEW OF EXAMPLE EMBODIMENTS

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrates examples of the present invention, and together with the description serve to explain the principles of the invention.

DESCRIPTION OF EXAMPLE EMBODIMENTS

This description provides examples not intended to limit the scope of the invention, as claimed. The figures generally indicate the features of the examples, where it is understood and appreciated that like reference numerals are used to refer to like elements.

An example embodiment contemplates a flexible security framework to support enhancements that would overcome the disadvantages of previous systems. Cisco, Microsoft and several other vendors have endorsed the role of the developing IEEE 802.1X standard as the preferred framework for edge security and are actively participating in the standardization efforts to foster interoperable implementations. The IEEE 802.1X Working Group is chartered with the goal of providing an interoperable security framework for port based access control that resides in the upper layers (for example, above the MAC layer). The primary philosophy for the port based access control layer is to enable the plug-in of new authentication schemes and key management methods without changing switches, NICs, Access Points, and so on. Another goal is to also leverage the main CPU resources for cryptographic calculations. This security philosophy is intended to provide end users and customers with decreased hardware cost and complexity, to enable customers to choose their own security solution, to permit the implementation of the latest, most sophisticated authentication and key management techniques with modest hardware, and to enable rapid development response to security issues.

When a host connects to the LAN port on a 802.1X switch and Access Point, the authenticity of the host is determined by the switch port according to the protocol specified by 802.1X, before the services offered by the switch are made available on that port. Until the authentication is complete, only EAPOL (see below) frames are allowed to be sent and received on that port. Once the host authentication is successful, the port switches traffic as a regular port. As an example, when a Windows 2000 PC is hooked on to a LAN switch port, and when a user logs in, the switch sends a message requesting the PC to identify itself. When the PC responds back with an identity frame, the switch makes use of the service of an authentication server to verify the credentials of the user. If the authentication server informs the switch that the user is authentic, then the switch opens its port for providing the network services of the switch.

Figure 1:
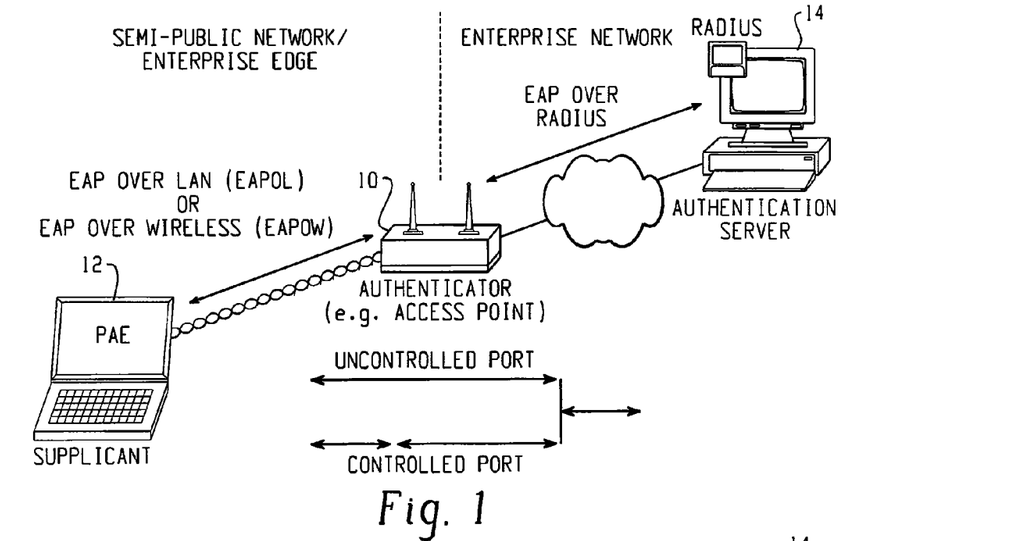
FIGS. 1 and 2 illustrate a network authentication arrangement in accordance with the present invention.

As used herein and as shown in FIG. 1, a "port" is a single point of attachment to the LAN infrastructure—for example, ports of MAC Bridges. A "Port Access Entity" (PAE) operates the algorithms and protocols associated with the authentication mechanisms for a given port of the system. An "authenticator PAE" 10 is an access point that wishes to enforce authentication before allowing access to services that are accessible via that port. The authenticator PAE 10 is responsible for communication with the supplicant, and for submitting the information received from the supplicant to a suitable authentication server in order for the credentials to be checked and for the consequent authorization state to be determined. The functionality of authenticator PAEs is independent of the actual authentication method. It merely acts as a pass-through for the authentication exchange, for example, a switch port. The "supplicant PAE" 12 is a PAE that wishes to access the services accessible via the authenticator. The supplicant PAE is responsible for responding to requests from the authenticator 10 for information that will establish its credentials, for example, an end-user PC, e.g. a Windows 2000 PC connected to the LAN switch port. An "authentication server" 14 verifies the credentials of the supplicant 12. It indicates in response whether or not the supplicant 12 is authorized to access the authenticator's services. It basically provides the authentication service for the authenticator PAE 10 that acts as a client, for example, a RADIUS server.

The IEEE 802.1X standard makes authentication more generic rather than enforcing a specific mechanism on the devices. 802.1X makes use of Extensible Authentication Protocol (EAP) for communication information. The 802.1X standard defines a standard for encapsulating the Extensible Authentication Protocol messages to that they can be handled directly by a LAN MAC service. This encapsulated form of an EAP frame is known as an Extensible Authentication Protocol Over LAN (EAPOL) frame and is defined in the standard. Alternatively, with Extensible Authentication Protocol Over Wireless (EAPOW), the EAPOL messages described earlier are encapsulated over 802.11 wireless frames. The packet exchange for an IEEE 802.1X conversation using EAP is highlighted in FIG. 2. These messages are a sub set of the 802.1X for 802.11 implementation described below since there is no WEP key required for wired 802.1X networks.

The EAP protocol described above was originally designed to provide an extensible method for a "point-to-point protocol" (PPP) server to authenticate its clients and possibly for the client to authenticate the server. The protocol describes an extensible packet exchange to allow the passing of authentication information between the client and the PPP server. Normally PPP servers rely on a centralized authentication server to validate the clients on their behalf. One of the more popular types of servers is a RADIUS server. Extensions to the RADIUS protocol have been contemplated to allow the passing of the EAP packets between the authentication server and the PPP server. In this case the PPP server is just a relay agent with the authentication conversation happening between the client and the RADIUS server. The RADIUS server informs the PPP server of the result of the authentication and whether to allow the client to access the network.

It has been contemplated to adapt EAP to WLANs using Public Key Infrastructure (PKI) with EAP-TLS as the authentication method. However, PKI schemes are very compute-intensive on the client systems, require careful planning and design of the overall architecture, and the overall solution costs may be prohibitive for typical enterprises. The only other defined authentication method EAP-MD5 was inadequate, as it does not support mutual authentication between the client and the authentication server.

The EAP protocol was designed so that any type of network access server could use it to validate its clients. In the case of a wireless access point the link to its radio client is not a PPP link but a WLAN. The IEEE 802.1X EAP over LAN (EAPOL) specification defines a method for encapsulating EAP packets in either Ethernet or token ring packets such that they may be transmitted over a LAN. The 802.11 specification also allows for data traffic between the client and access point to be encrypted using a WEP encryption key. In early implementations, the access point would have a single key, which had to be programmed into each client radio and all traffic in the wireless cell would be encrypted with the single key.

An example embodiment includes a newly-developed protocol called the "light extensible authentication protocol" (EAP-Cisco Wireless or "LEAP") authentication type. By using EAP authentication, the client and RADIUS server have a shared secret, usually a username and password combination. The RADIUS can pass enough information to the access point such that the client and access point may independently derive an encryption key that is unique for this client-access point pair. EAP-Cisco Wireless offers the following benefits: requires minimal support from the client CPU while offering mutual authentication; support for embedded systems, such as printers; support for host machines running operating systems that did not have the support for native EAP or routines to allow the use of the PKI authentication; and support for all popular operating systems such as Windows 95, Windows 98, Windows NT, Windows 2000, Windows Millennium, Windows CE, Linux and Mac OS 9.X.

Figure 3:
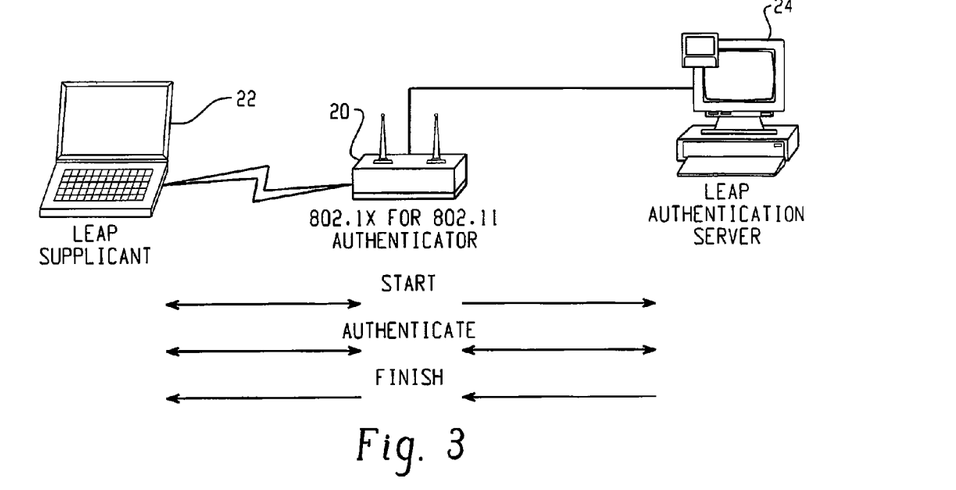
FIGS. 3 through 7 depict steps in the authentication process in accordance with the present invention.

As shown in FIG. 3, the EAP-Cisco Wireless implementation in accordance with a particular embodiment comprises three components described as follows. A EAP-Cisco Wireless supplicant 22 is provided, available as a driver update for Windows 95, 98, NT, 2000, Windows Millennium, WinCE, Linus and Mac OS 9.X. This EAP-Cisco Wireless supplicant 22 can be a piece of client software and firmware that resides on the host PC with the WLAN adapter. The EAP-Cisco Wireless supplicant 22 can be set-up to either have the username and password stored in the WLAN NIC card or to have it be manually entered via a network logon process. An 802.1X for 802.11 authenticator 20 is provided to be available as a software update for Cisco 340 series and newer access points. A EAP-Cisco Wireless authentication server 24 is a RADIUS Server that implements EAP-Cisco Wireless authentication, such as Cisco Secure Access Control Server (ACS) Version 2.6. The entire authentication and key distribution process is accomplished in three phases, Start, Authenticate and Finish as illustrated in FIG. 3.

Figure 4:
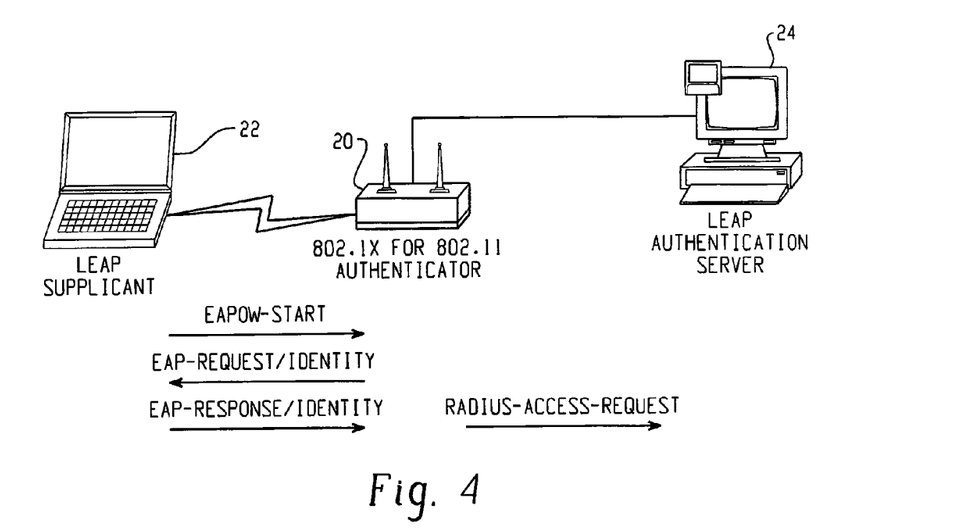

FIGS. 4 through 7 summarize the different packet exchanges for each phase between the EAP-Cisco Wireless supplicant 22, the access point authenticator 20, and the EAP-Cisco Wireless-RADIUS server 24. FIG. 4 shows an 802.1X over 802.11 exchange using the EAP-Cisco Wireless authentication protocol.

The start phase of EAP-Cisco Wireless Authentication is shown in FIG. 4. In the start phase the following packets are exchanged between the entities. The EAPOW-Start (or EAPOL-Start in 802.1X for Wired networks) is used to start the authentication process and is directed by the client/supplicant 22 to the AP/authenticator 20, in accordance with 802.1X. The EAP-Request/Identity is used by the AP/Authenticator 20 to request the client's/supplicant's identity, in accordance with the message definition in RFC 2284. The EAP-Response/Identity is used by the client/supplicant 22 to deliver the identifying user name and password to the AP/Authenticator 20, in accordance with the definition in RFC 2284.

Figure 5:
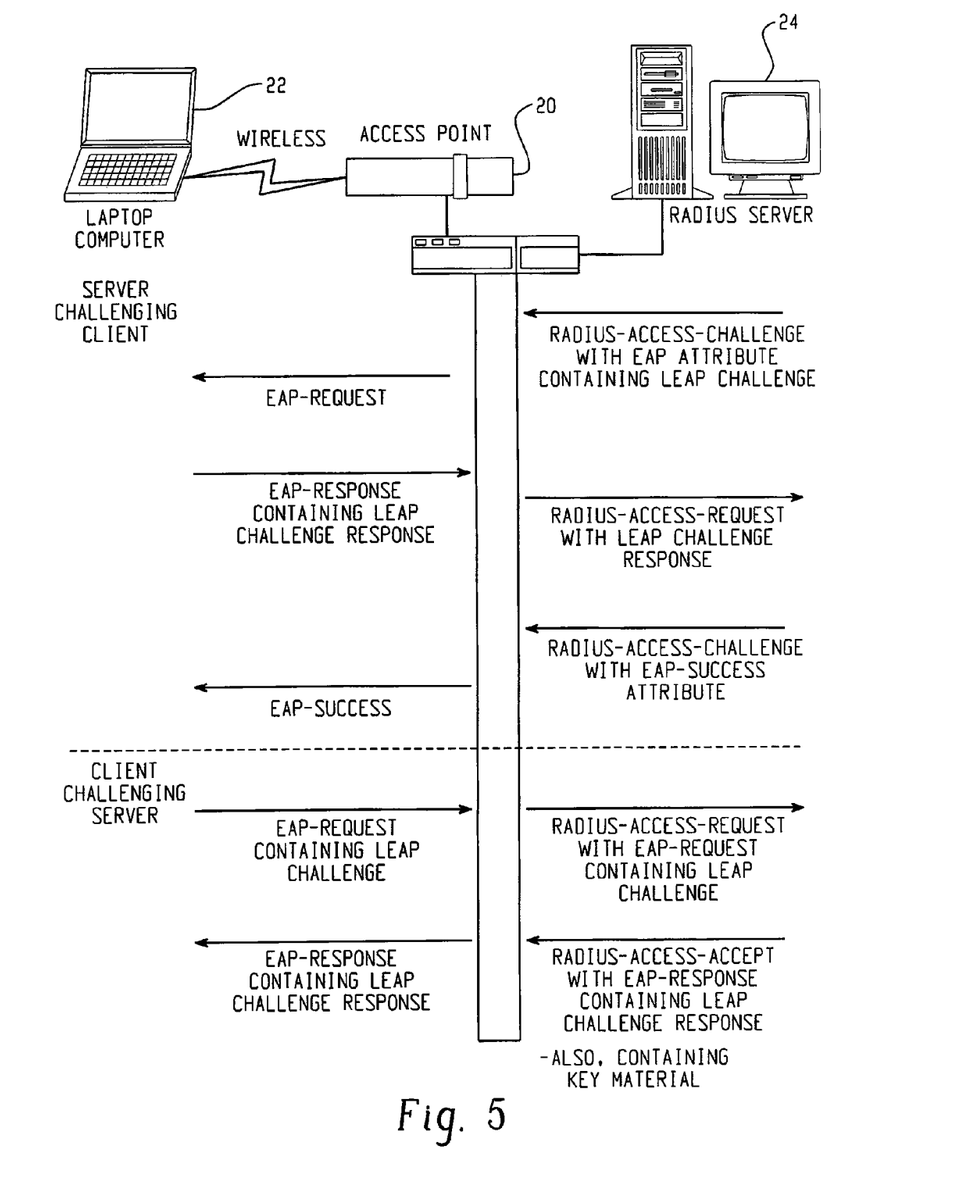
Figure 6:
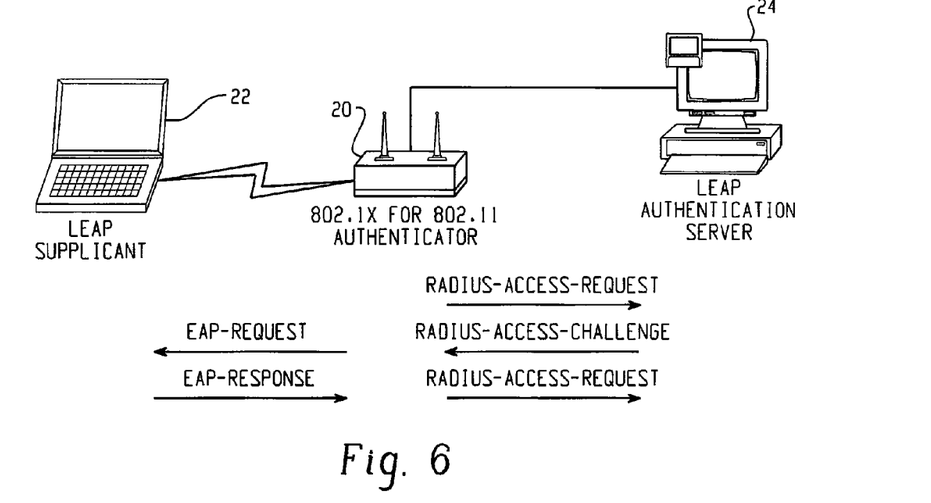

The Authenticate Phase of EAP-Cisco Wireless Authentication is shown in FIG. 5. The authenticate sequence can vary based on the mutual authentication method chosen between the client 22 and the authentication server 24. For example, with the present EAP-Cisco Wireless authentication, the sequence of messages occurs as described in the example embodiment of FIG. 5. In the example embodiment as shown in FIG. 6, the EAP-Response/Identity message from the client/supplicant 22 is forwarded to the RADIUS server 24 by the AP 20 in the form of a RADIUS-Access-Request with EAP extensions, in which EAP is encapsulated in the RADIUS protocol. The RADIUS server 24 then responds back to the access-request with a RADIUS-challenge, which then gets responded to by the client 22, in accordance with the RADIUS protocol described in RFC 2138. The present EAP-Cisco Wireless authentication is a mutual authentication method with the access point 20 in the middle acting solely as a transport vehicle. For example, the access point 20 in the authenticate phase moves the contents of the packets from EAP to RADIUS and vice versa. In this way, no logon functions are performed through the AP, thereby precluding network access to rogue APs.

Alternately, the present invention can support other message types, such as Transport Level Security (TLS) as described in RFC2286 to transfer certificates in a PKI implementation, in which EAP-TLS described in RFC2716 messages would be used. Other such message types can also be used without departing from the invention.

Figure 7:
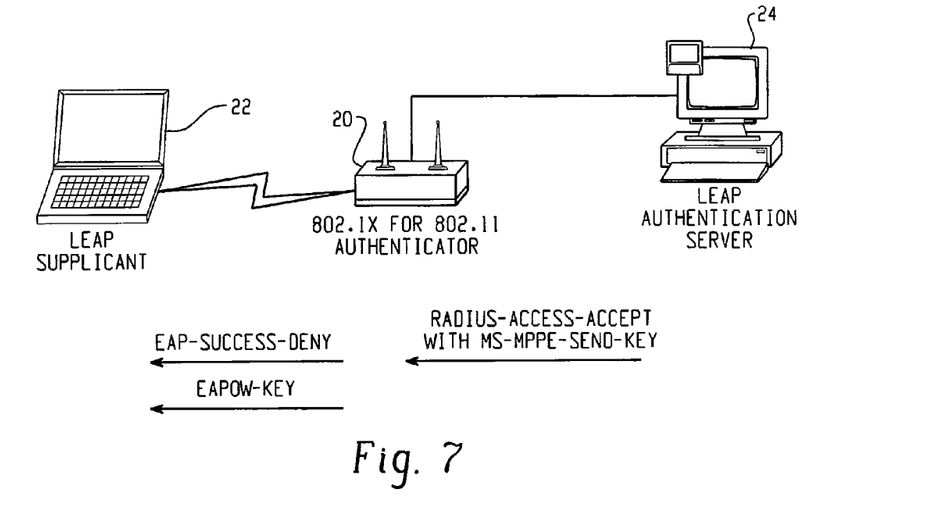

The finish phase of the present EAP-Cisco Wireless Authentication is shown in FIG. 7. If the user is discovered to be invalid, the RADIUS server 24 sends a RADIUS deny packet with an embedded EAP fail. If the user is discovered to be valid, the server 24 sends a RADIUS-Access-Accept packet with an EAP success attribute. The RADIUS-Access-Accept message also contains the MS-MPPE-Send-Key attribute defined by RFC2548 to the access point 20. The key needs to be sent to the access point 20 in order for it to obtain the session key that the client 22 will be using to talk with it. Both the client 22 and the RADIUS server 24 who are using the EAP-Cisco Wireless authentication derive the session key from the user's password. The IEEE 802.11's encryption may be based on a 40/64-bit or 104/128-bit key. The key derivation routines provide a key longer than needed. When the access point 20 receives the key from the RADIUS server 24 (via the MS-MPPE-Send-Key attribute) it sends an EAPOL-KEY message to the client 22 supplying the key length and key index to use. The key value (or actual WEP key) is not sent since the client 22 has already derived it on its own using preloaded algorithms and reference data corresponding to those preloaded into the authentication server. The packet is encrypted using the full-length derived key. The access point 20 also sends an EAPOL-KEY message supplying the length, key index and value of the multicast/broadcast key. This packet is also encrypted using the full-length derived session unicast key. This completes the entire mutual authentication and key derivation and transfer between the EAP-Cisco Wireless Authentication Server 24 and the EAP-Cisco Wireless Supplicant 22. Thus, the intermediary access points 20 only pass the encrypted packets, and do not "share the secret," i.e. do not possess the means to decrypt the packets. In this way, the clients of the WLAN have become invulnerable to rogue AP attacks.

The example embodiment is particularly useful for detecting rogue access points that may seek to access the network. During the start phase of authentication, the client/supplicant 22 directs a packet to the network, e.g. the server 24, through the AP/authenticator 20. A network response packet is received by the client/supplicant 22 from the network, through the AP/authenticator 20. In order to detect a rogue access point, the client/supplicant 22 performs a routine of determining whether the access point 20 is a valid network access point or a rogue access point. This determination is based on whether the received network response packet is in conformity or nonconformity with predetermined expectations. The "predetermined expectations" can include the "shared secret" information disclosed hereinabove or any other standard applied for determining conformity.

In an example embodiment, a valid network access point 20 conforms with expectations if it forwards data traffic from the network conforming with IEEE 802.1X standards. If the forwarded data traffic is determined by the client/supplicant 22 to not conform, the access point is determined to be a rogue access point. Further, in another preferred embodiment, a valid network access point 20 is determined to conform with predetermined expectations if the mutual authentication disclosed hereinabove is successful. Non-conformity is determined by the failure of the mutual authentication. After issuing a challenge from the server 24 to the client 22, the client 22 issues a counter-challenge back to the server 24. If the counter challenge fails, the access point is identified as a rogue AP.

If an access point is determined to be a rogue access point, it is reported as such to the network. In one aspect, the rogue access point is reported to the network by the client 22 through a valid network access point 20, at a later time after the client 22 has contacted a valid AP and authenticated to the network.

The EAP-Cisco Wireless Authentication and Key distribution can be deployed in a large campus. EAP-Cisco Wireless supplicant or client software that can be supported by a variety of operating systems, including Windows 95, Windows 98, Windows NT 4.0, Windows 2000, Windows Millennium, WinCE 3.0, Mac OS 9.x, and any other type of platform that may be commonly used. The client authentication can be set-up to work in the default open/shared-key modes defined by the standards or in EAP-Cisco Wireless mode.

Figure 8:
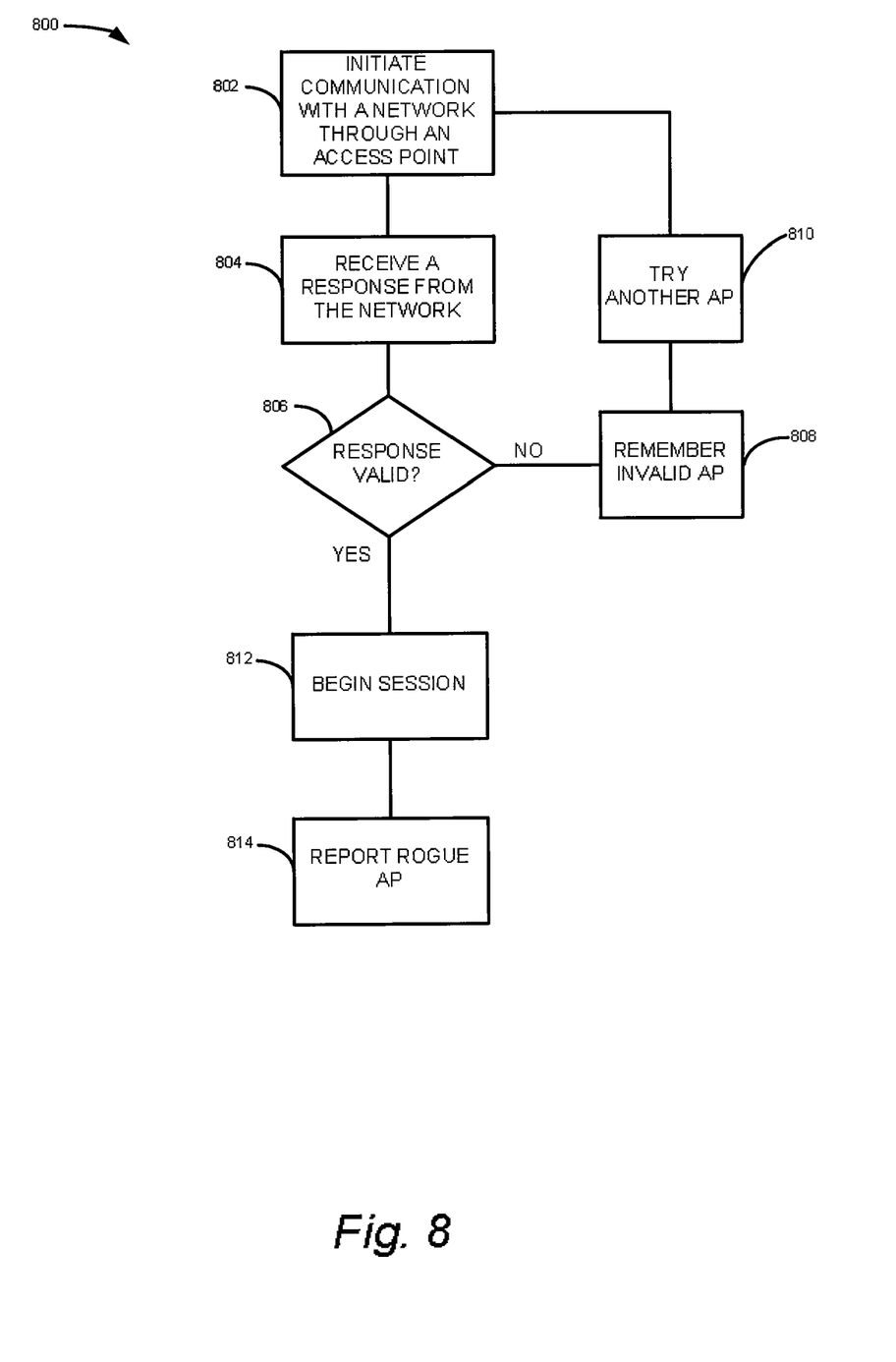
FIG. 8 illustrates an example of a methodology for rogue access point detection.

In view of the foregoing structural and functional features described above, a methodology 800 in accordance with various aspects of the present invention will be better appreciated with reference to FIG. 8. While, for purposes of simplicity of explanation, methodology 800 of FIG. 8 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement methodology 800 in hardware, software, or a combination thereof.

Figure 2:
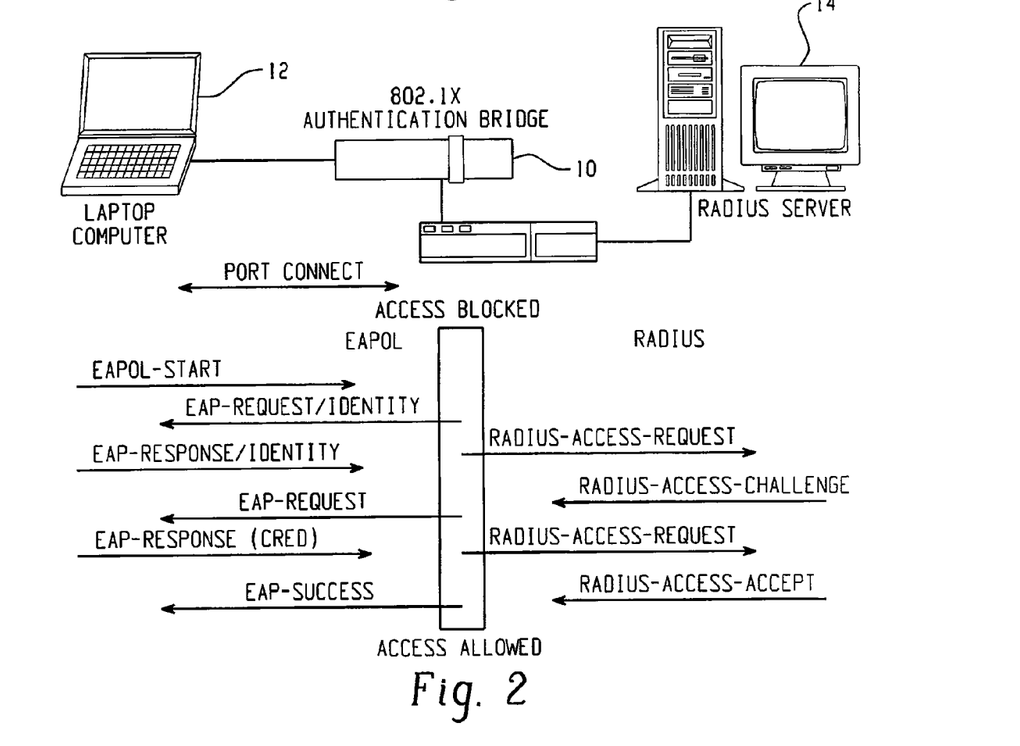

At 802, a mobile node (e.g. a wireless client) initiates communication with a network through an access point. The mobile node may be associating with a network that the mobile node has not previously associated with (such as for example when powering up), or the mobile node may be initiating a roam to a new access point. This could correspond to the start phase of an authentication and key distribution process as illustrated in FIG. 3. For example, the mobile node may send an EAPOL-START message as illustrated in FIG. 2 or an EAPOW-START message as illustrated in FIG. 4.

In an example embodiment described herein supra, the client and authentication server have a 'shared secret' such as a usemame and password combination, no logon functions are performed by the AP. Thus, a rogue AP that is not coupled to the authentication server would be unable to provide an appropriate response to EAP (or LEAP) compatible type messages, such as for example an EAP or LEAP message that requires knowledge of the shared secret, because a rogue AP will not have access to the 'shared secret.' A malicious rogue AP, that is a rogue AP that is listening to wireless traffic to acquire information, may be able to provide some responses to EAP or LEAP messages, for example sending an EAP-REQUEST/IDENTITY responsive to an EAPOL (or EAPOW)-START message, but would not be able to mutually authenticate with a mobile node because it lacks access to the shared secret.

At 804, the mobile node receives a response from the network. In an example embodiment, the mobile node would expect to receive one or more of a EAP-REQUEST IDENTITY (as illustrated in FIGS. 2 and 4) and an EAP-REQUEST (as illustrated in FIGS. 2 and 5).

In an example embodiment, the mobile node may receive an EAP-SUCCESS message as illustrated in FIG. 5. Upon receiving an EAP-SUCCESS message, the mobile node may challenge the server as illustrated in FIG. 5. For example, the mobile node may send an EAP-REQUEST containing a LEAP challenge. The mobile node would anticipate receiving an EAP-RESPONSE containing a LEAP challenge response as illustrated in FIG. 5.

At 806, the mobile node determines whether the response received from the access point is a valid response. For example, if the mobile node initially sent an EAPOL-START packet to the network through the AP, an EAP-REQUEST/IDENTIY response would be expected as illustrated in FIGS. 2 and 4. If the response is not an EAP-REQUEST/IDENTITY, or the EAP-REQUEST/IDENTITY is improperly formatted, the mobile node can determine that the AP is a rogue AP.

In the example embodiment where a proper EAP-REQUEST/IDENTITY is received, the mobile node could respond with an EAP-RESPONSE/IDENTITY. The mobile node would expect to receive an EAP-REQUEST, as illustrated in FIGS. 2, 5 and 6. If the mobile node does not receive an EAP-REQUEST or the EAP-REQUEST is improperly formatted, the mobile node can determine the AP is a rogue AP.

After sending an EAP-RESPONSE to the EAP-REQUEST, the mobile node would expect to receive an EAP-SUCCESS. If the mobile node does not receive an EAP-SUCCESS or the EAP-SUCCESS is not properly formatted, the mobile node can determine that the AP is a rogue AP.

If the mobile node receives an EAP-SUCCESS message, then the mobile node can send a challenge the authentication server as illustrated in FIG. 5. For example, the mobile node can send an EAP-REQUEST containing a LEAP challenge. A rogue AP not in communication with a server with the 'shared secret' is unable to provide a proper response.

If the AP is a valid AP, it would send the request to the authentication server (as illustrated a RADIUS-ACCESS-REQUEST containing LEAP challenge is sent from the AP to the RADIUS server). The mobile node should receive an EAP-RESPONSE containing LEAP challenge response from the AP. If the response is invalid, the mobile node can determine that the AP is a rogue AP (e.g. the AP is not in communication with the RADIUS server).

If at 806, the mobile node determines that the AP is a rogue AP (NO), the mobile unit remembers the invalid AP, e.g. stores data about the potentially rogue AP. In an example embodiment the data can include an identifier for the AP (e.g., the BSSID) and the reason for determining the AP was a rogue AP (e.g., invalid, or no, response to an EAP-START message). At 808 the mobile node begins searching for another AP to communicate with the network. Upon roaming to another AP, the mobile node initiates communication with the network at 802 and steps 804 and 806 are also repeated.

If at 806, the mobile node determines that the responses from the AP are valid. the mobile node determines that the AP is a valid AP (YES). The mobile completes associating with the AP and begins a session with AP at 812. If prior to associating with the valid AP the mobile node detected a rogue AP, at 814 the mobile node reports the rogue AP to the network through the valid AP.

The invention claimed is:

1. A method, comprising:

initiating, via a client device, a first communication to an authentication server through a first access point;

determining, by the client device, the first access point is a rogue access point based on receiving an invalid response to the first communication from the first access point;

storing, in a memory associated with the client device, data representative of the first access point and the received invalid response;

initiating, via the client device, a second communication to the authentication server through a second access point;

determining, by the client device, the second access point is a valid access point based on receiving a valid response to the second communication; and reporting the first access point is a rogue access point by the client device through the second access point in accordance with the data stored in the memory associated with the client device.

2. The method of claim 1, the first communication further comprising authenticating a supplicant to a network.

3. The method of claim 2, the first communication further comprising performing a mutual authentication by sending a challenge packet to the authentication server.

4. The method of claim 3, the first communication further comprising authenticating a supplicant to a network.

5. The method of claim 4, the first communication further comprising performing a mutual authentication by sending a challenge packet to the authentication server.

6. The method of claim 1 wherein the predetermined expectations comprise data traffic conforming with IEEE 802.1X standards.

7. The method of claim 1, the first communication further comprises a mutual authentication to a network; and
   the determining the first access point is a rogue access point is responsive to a failure of the mutual authentication.

8. The method of claim 7, the first communication comprises issuing a challenge to an authentication server; and
   the determining the first access point is a rogue access point is responsive to determining the response received from the first access point is not proper based on a shared secret between a supplicant and the authentication server.

9. The method of claim 8 wherein the shared secret is a username and password.

10. The method of claim 9, the response to the first communication comprises a key index; and
    the determining the first access point is a rogue access point is responsive to the first access point using an encryption key that does not match an encryption key derived from the key index.

11. The method of claim 10 wherein the encryption parameters are based on one of a group consisting of a 40/64-bit and a 104/128-bit key.

12. The method of claim 1, the first communication comprises one of a group consisting of an EAP-START compatible message, an EAPOL-START compatible message, and an EAPOW-START compatible message; and
    the determining the first access point is a rogue access point is based on receiving an invalid response to the one of a group consisting of an EAP-START compatible message, an EAPOL-START compatible message, and an EAPOW-START compatible message.

13. An apparatus, comprising:
    a wireless client operable to communicate with wireless access points;
    the wireless client is configured to initiate a first communication to an authentication server through a first access point;
    the wireless client is operable to determine the first access point is a rogue access point based on receiving an invalid response to the first communication from the first access point;
    the wireless client is operable to store data representative of the first access point and the received invalid response in an associated memory;
    the wireless client is operable to initiate a second communication to the authentication server through a second access point;
    the wireless client is operable to determine the second access point is a valid access point based on receiving a valid response to the second communication; and
    the wireless client is configure to report the first access point is a rogue access point through the second access point after determining the second access point is a valid access point in accordance with the data stored in the memory associated with the wireless client.

14. The apparatus of claim 13, the first communication further comprises sending a challenge packet to the authentication server.

15. The apparatus of claim 14, the wireless client determines the first access point is a rogue access point responsive to an invalid response to the challenge packet.

16. The apparatus of claim 14, the wireless client is operable to determine the first access point is a rogue access point responsive to determining the response to the challenge packet received from the first access point is invalid proper based on a shared secret between the wireless client and the authentication server.

17. The apparatus of claim 16, wherein the shared secret is a username and password.

18. The apparatus of claim 13, response to the first communication comprises a key index; and
    the wireless client is operable to determine the first access point is a rogue access point responsive to the first access point using an encryption key that does not match an encryption key derived from the key index.

19. An apparatus, comprising:
    means adapted for initiating a first communication to an authentication server through a first access point;
    means adapted for determining the first access point is a rogue access point based on receiving an invalid response to the first communication from the first access point;
    means adapted for storing data representative of the first access point and the received invalid response;
    means adapted for initiating a second communication to the authentication server through a second access point;
    means adapted for determining the second access point is a valid access point based on receiving a valid response to the second communication; and
    means adapted for reporting the first access point is a rogue access point through the second access point responsive to the means adapted for determining the second access point is a valid access point in accordance with the stored data.

20. The apparatus according to claim 19, further comprising:
    the means adapted for initiating a first communication further comprises means adapted for sending a challenge to the authentication server; and
    the means adapted for determining the first access point is a rogue access point is responsive to receiving an invalid response to the challenge to the authentication server;
    wherein the challenge is based on a shared secret with the authentication server.

* * * * *